United States Patent [19]
Friedrich et al.

[11] Patent Number: 5,833,311
[45] Date of Patent: Nov. 10, 1998

[54] ADD-ON CHILD SEAT

[75] Inventors: Matthias Friedrich, Hiddenhausen; Volkmar Wölfl, Vlotho, both of Germany

[73] Assignee: Van Riesen GmbH U.Co., KG, Enger, Germany

[21] Appl. No.: 682,848

[22] Filed: Jul. 12, 1996

[30] Foreign Application Priority Data

Jul. 13, 1995 [DE] Germany ................ 195 25 422.2

[51] Int. Cl.⁶ .......................... B60N 2/42; B60R 21/16
[52] U.S. Cl. ............ 297/216.11; 297/488; 297/256.15; 297/467
[58] Field of Search .................. 297/216.11, 256.15, 297/488, 467; 280/730.1, 735

[56] References Cited

U.S. PATENT DOCUMENTS

| | | | |
|---|---|---|---|
| 4,634,185 | 1/1987 | Kassai | 297/216.11 |
| 4,653,809 | 3/1987 | Czernakowski et al. | 297/488 |
| 4,834,420 | 5/1989 | Sankrithi et al. | |
| 5,375,908 | 12/1994 | Goor | 297/216.11 |
| 5,468,014 | 11/1995 | Gimbel et al. | 280/735 |
| 5,492,361 | 2/1996 | Kim | 280/730.1 |
| 5,511,850 | 4/1996 | Coursey | 297/256.15 |

FOREIGN PATENT DOCUMENTS

| | | |
|---|---|---|
| 9111206 | 2/1992 | Germany . |
| 9112752 | 2/1992 | Germany . |
| 4235324 | 4/1993 | Germany . |
| 9208309 | 12/1993 | Germany . |
| 9315509 | 3/1994 | Germany . |
| 9409377 | 9/1994 | Germany . |
| 29509136 | 10/1995 | Germany . |

*Primary Examiner*—Peter M. Cuomo
*Assistant Examiner*—Anthony D Barfield
*Attorney, Agent, or Firm*—Jacox, Meckstroth & Jenkins

[57] ABSTRACT

An add-on child seat relates to an add-on child seat comprising a seating surface and a back rest surface for the child. At a distance to these surfaces there is provided an airbag as an impact protection for the child and which, in the case of a collision of the vehicle, is to be released. The airbag is formed as a knob shaped end of a carrier, this carrier extending between the legs of the child and is anchored in the region under the seating surface. With this design, in the case of an accident, the child can be quickly and simply removed from the seat without having to interrupt the mounting parts of the airbag.

8 Claims, 3 Drawing Sheets

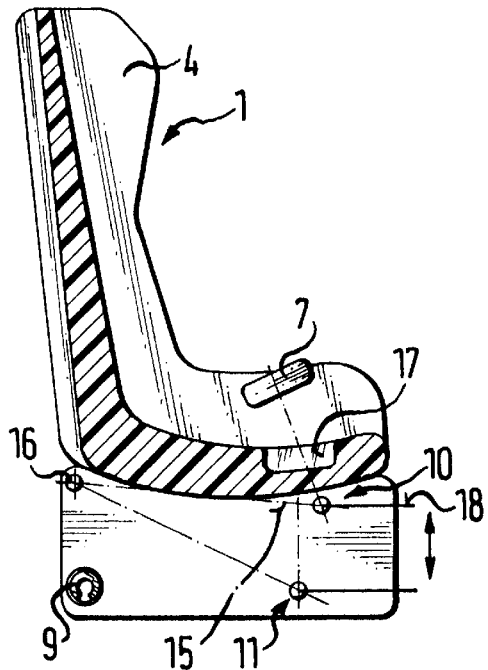
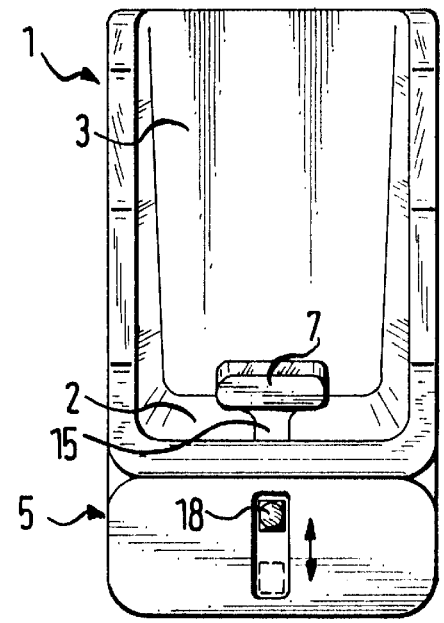
FIG. 3a    FIG. 3b
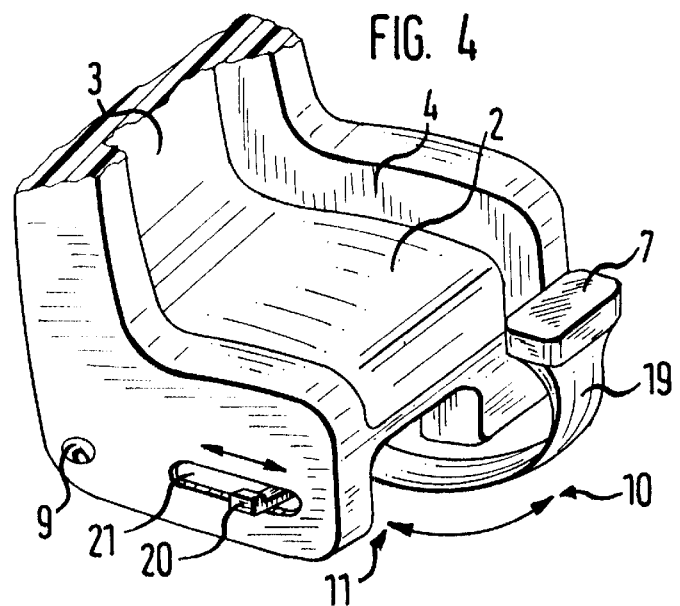
FIG. 4

ADD-ON CHILD SEAT

BACKGROUND OF THE INVENTION

The invention relates to a add-on child seat according to those features specified in the preamble of claim 1.

DESCRIPTION OF THE PRIOR ART

Nowadays, add-on child seats are compulsory for transporting children should the vehicle not comprise any integrated child seats. According to the constructional size these are classified into groups which are graduated depending on the size and age of the child to be secured therein. Those add-on child seats which are concerned here are particularly employed for the groups I and larger, in other words for children past infancy. Generally they comprise a seating shell with a seating surface and a back rest surface as well as the usual lateral border surfaces. With the more comfortable models, the seating shell is additionally pivotally mounted in a separate carrying frame, in order to achieve a seating position and a sleeping position. Common to all embodiments is the belt strap retaining system, as a rule comprising two shoulder belts and a common lap belt, as well as also an additional step belt with some constructional types.

The child seat is usually attached to the vehicle using the vehicle's own three or two point belt, or also using a separate belt system.

Also in the field of these add-on or integrated child seats it is known that the seat with the integrated belt strap does not alone provide all round protection, since for example in the case of a frontal impact of the vehicle, although the child is held in the seat, the comparatively heavy head of the child is thrown forward, by which means the cervical vertebra may be subjected to high loads. As a result proposals have already been made to equip such add-on child seats with an airbag arranged in front of the child to achieve a better protection.

A transportable airbag is disclosed in DE-U-9112752 which is arranged either on the rear side of the front seat or on the lap of the child. In the first case the distance between the head of the child and the airbag is generally too large, and in the latter case the directed positioning which is particularly important for the proper functioning cannot be assured. Moreover this airbag cannot be mounted or is difficult to mount on account of the usual four or several point belt systems associated with the add-on child seat of the previously mentioned type. Finally, the airbag situated on the lap forms a table shaped structure so that there is a danger that the child places toys or other objects on the surface. These however, in the case of an actuation, would be thrown onto the child in a projectiled manner, which is to be avoided under ail circumstances.

An airbag in the rebounding surface of a child seat is disclosed in DE-U-9409377. The rebounding surface is laterally coupled and can be swung open, and thus holds the child firmly in the seat with a positive fit. The upper side is formed flat, as is usual with such systems. This table type formation, as already mentioned, represents a large potential risk when objects are located thereon. Furthermore the straps holding the child positively in the seat are often difficult to open after a collision, in particular because those people rushing to the rescue are not generally familiar with the operation. To remove the child with the strap lying close is however here not possible or extremely difficult. Moreover the strap is difficult to operate particularly in small vehicles.

An add-on child seat is known from DE-U-9208309 and which comprises a strap coupled behind the back rest surface, said strap being swung over the child after the child has mounted, so that the airbag situated therein comes to rest in front of the child, that is to say approximately in the lap region. With this design there is also the problem with misuse safety. Also this strap represents a potential danger, since the child is difficult to remove from the seat after an accident, if for example this strap is jammed or the persons rushing to help are not acquainted with the pivoting mechanism.

A combined belt-airbag retaining system is known from DE-A-4235324, in which the airbag function serves merely for the secure lying of the belt and its padding, but not for impact protection within the true meaning. The belt is thus constructed similar to an airbag, but comprises a considerably reduced volume compared to a pure airbag. Apart from the fact that the system described therein is very complicated and expensive, already on account of the complicated gas conduction, it further has the disadvantage that the shoulder belts end at a common breast contact padding with which they are fixedly attached. The application of the shoulder belts is thereby made considerably more difficult, since the head of the child must be guided through the intermediate shoulder belts and the free space formed by the breast contact padding. The corresponding applies to the removal of protection device after an accident. Furthermore the child retaining system described therein only has a limited function of an airbag, since the inner volume of the shoulder belt designed like an airbag is comparatively small due to design constraints.

SUMMARY OF THE INVENTION

Proceeding from this it is the object of the present invention to design an add-on child seat avoiding the previously described disadvantages such that on the one hand the construction has a simple design and on the other hand it can be reliably and simply operated, even on removal of the child after an accident.

This object is achieved by those features specified in the characterizing part of claim 1.

The airbag is thus arranged at end of a carrier which extends between the legs of the child and is anchored in the region under the seating surface and this being such that the airbag forms the knob shaped free end of this carrier. In this way the child can be removed from the seat without problem after opening of the belt. The belt strap retaining system belonging to the child seat is not disadvantaged and functions completely independently of the airbag system and thus can be operated in the usual manner. The airbag arranged at the end of the carrier however offers the additionally desired impact protection, the arrangement of the carrier preventing the feared submarining effect independently of the belt strap retaining system. Moreover with this arrangement, a fastening of the airbag is made possible with a relatively short lever on the child seat, this allowing a solid constructional embodiment with a relatively small design requirement. The formation of the airbag as a knob shaped end of the carrier at the same time simplifies not only the getting in and out but also places the airbag in an optimal position, whereby the knob shaped design ensures that the airbag is not misused as a table or placing surface and that the previously described potential danger resulting therefrom is eliminated.

If the airbag is to be movably arranged from a working position into a getting-in position, then according to the invention, preferably in both positions, a lock or otherwise a stop is provided in such a form that in the working position the carrier is positively supported in the back throw direction of the airbag. Otherwise a corresponding switch arrangement ensures that the release of the airbag can only proceed in the working position. This may for example be effected by closing an electrical contact in the connection lead to the propellant charge, when the airbag is brought into the working position.

Preferably the airbag arranged at the end of the carrier will comprise a functional unit comprising the actual air bag and the propellant charge which produces the gas volume, the functional unit being occluded using a suitable covering with a predetermined breaking point. Then there is merely an electrical lead connection to be made to the airbag, this connection preferably being guided protectively within the carrier.

A particularly useful embodiment results when the carrier also forms part of the belt system in which a part of the belt lock is fastened to the carrier. With this, at the belt system side, the appropriately provided step belt can be dispensed with and replaced by the carrier. It is clear that the carrier in this case is designed so that it runs close to the body and comprises corresponding padding at least on the side facing the child.

If the child seat is pivotably equipped, i.e. comprises a carrying frame and a seating shell pivotably mounted therein, it is useful to fasten the carrier at the seating shell side so that the airbag remains in the directed position independently of the pivot position of the seat. It is conceivable to provide a relative movement between the seating shell and the carrier for extreme pivot positions, in order to ensure an effective position of the airbag independently of the respective pivot position of the seat.

For simplifying the getting in and out of the child as well as for the protective accommodation of the airbag when the seat is not used, it can be useful to pivotably couple the carrier and to pivot the carrier using a lever which is accessible from the side or from the front. With this the airbag must be locked at least in the pivoted-in position (working position) i.e. positively supported in the throw back direction. According to the preferred type of movement, the coupling position in the frontal region may be under the seat surface—then a pivoting movement is effected about approximately 180°, or under the back rest—then practically only a lifting motion is effected. For receiving the airbag, a recess should be provided in such a manner in the seating surface or in the front side of the child seat that the airbag can be inserted flush, so that the airbag lies within the child seat.

Alternatively a guide for the carrier may be provided under the seating surface, within which the carrier is displaceably arranged. According to the shaping of the carrier, with such a guide, a lifting and/or pivoting motion may be achieved. Also in this case, an easily accessible lever, preferably at the side, is provided over which the carrier can be travelled.

BRIEF DESCRIPTION OF THE DRAWINGS

The invention is hereinafter described in more detail by way of embodiment examples represented in the drawings. These show.

DETAILED DESCRIPTION OF THE PREFERRED EMBODIMENTS

Figure 1A:
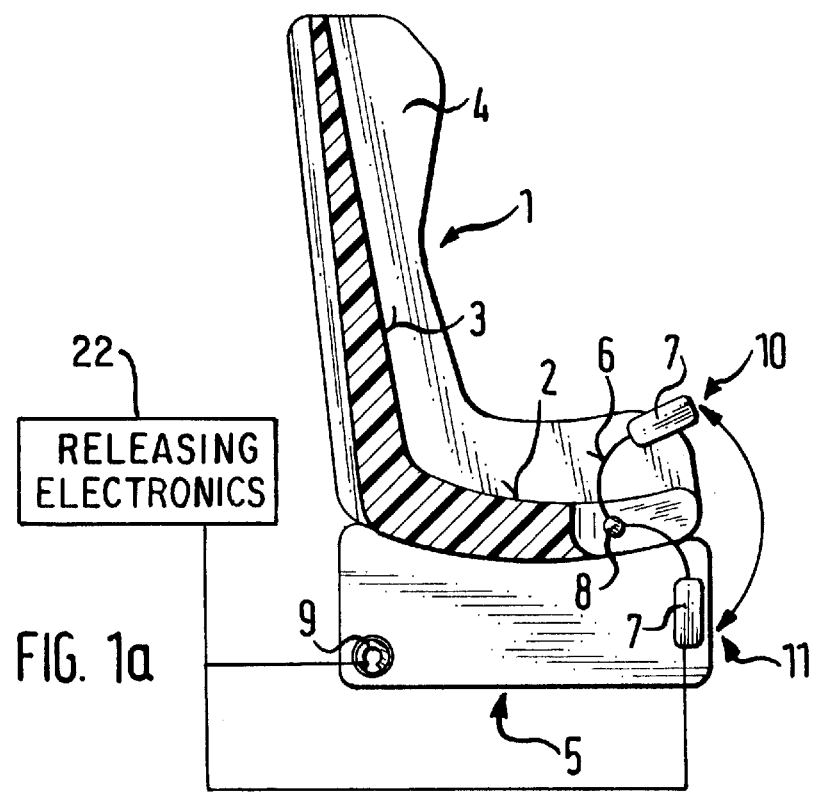
FIG. 1a longitudinal section through the child seat in an exaggerated schematic representation, FIG. 1b a frontal view of the child seat as represented by way of FIG. 1a, FIG. 2a a second embodiment of the child seat represented according to FIG. 1a, FIG. 2b a frontal view of the child seat according to FIG. 2a, FIG. 3a third embodiment of the child seat represented according to FIG. 1a, FIG. 3b frontal view of the child seat according to FIG. 3a and FIG. 4 a perspective view of the lower part of a fourth embodiment variation of the child seat.
Figure 1B:
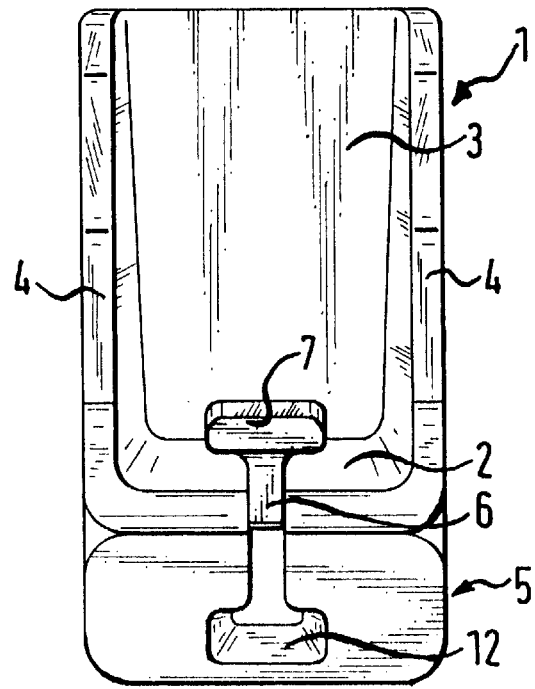

The add-on child seat represented schematically by way of FIGS. 1a and 1b comprises a seating shell with a seating surface 2 and a back rest surface 3 for the child to be transported therein. The seating shell 1 further comprises lateral rests 4. The seating shell 1 is pivotally mounted on a carrying frame 5 which is placed on the vehicle seat. According to the constructional embodiment, either only the carrying frame 5 or otherwise the seating shell 1 is to be secured using a lap belt or a three point belt in the vehicle. These attachment types are known and are therefore not described further here.

Under the seating surface 2, a carrier 6 having a laterally viewed C-shape is pivotally attached at one end to the seating shell 1. The other end of the carrier carries an airbag 7. The pivot axis is indicated at 8. The airbag 7 comprises, in a manner known per se, an airbag and a propellant charge which are closed to a knob type body formed at one end of the carrier 6 using a protective cavity. The propellant charge is connected to a releasing device via an electrical lead running though the carrier 6, said releasing device being integrated into the carrying frame 5 of the seat. With the child seat illustrated, the airbag 7 together with all components including the voltage supply are accommodated in the child seat, the seat can be connected to the voltage supply of the vehicle via a contact plug 9. Alternatively, instead of the releasing electronics of the airbag 7 which are integrated into the seat, the releasing electronics available in the vehicle may also be connected.

With the coupling about the axis 8, the carrier 6 with the airbag 7 located at the end may be pivoted from a working position 10 to a getting-in and -out position 11. In the working position 10 the airbag 7 can be locked and is ready for releasing. The airbag then lies in the favorable position for protecting the child over the thighs and in front of the body of the child. For getting out or for transportation, the airbag is pivoted into the getting-in position. While in the getting-in position, releasing electronic 22 (FIG. 1a) causes the electrical contact between the connection lead 9 and propellant charge at the end of carrier 6 to become disconnected. The airbag 7 then lies protected in a recess 12 at the front side of the carrying frame 5. The pivoting in and out of the carrier 6 is effected via a suitable lever mechanism which is not shown in detail here.

Figure 2A:
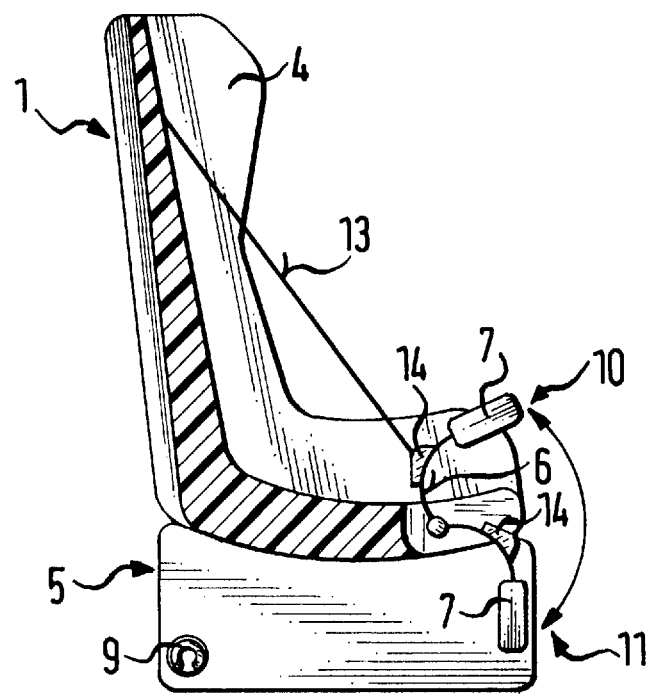
Figure 2B:
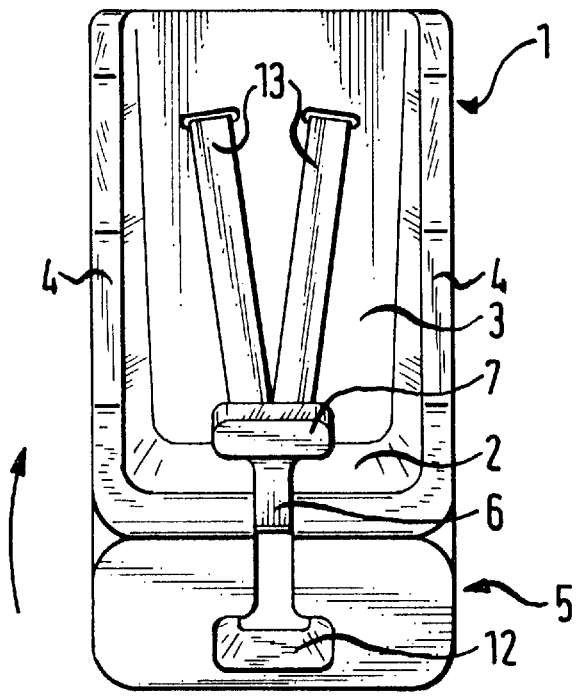

The embodiment variations shown by way of FIGS. 2 differ from those previously described in that the carrier 6 is part of the belt system on the seating shell side. The belt system with this embodiment comprises two shoulder belts 13 and a step belt which is formed by the lower part of the carrier 6 (in position 10). Further, the receiving part 14 of a belt lock which is not represented in detail is fastened to the carrier 6. Those insertion parts attached to the end of the shoulder belt 13 may be introduced into this receiving part 14 and be locked in the usual manner. This embodiment variation which connects the airbag 7 to the belt system in a functional manner ensures that after strapping on the child in the seat, the airbag 7 is arranged in its directed position 10, otherwise the closing of the belt lock is not possible. In the getting-in position 11 on the other hand, the receiving part 14 as well as also the airbag 7 lie protected within the recess 12, which simplifies getting into the seat and protects these components against inadvertent damage.

The embodiment variation according to FIG. 3 differs from those previously described by the coupling of the carrier. The carrier 15 which is shown in FIG. 3a only with regard to its geometric arrangement, comprises from a lateral view an approximate L-shaped form and is pivotally movable about an axis 16 at the end side under the back rest of the seating shell 1. The airbag 7 which is pivotable about the axis 16, undergoes, essentially a lifting movement on its pivotal movement from the working position 10 into the getting-in position 11, whereby the airbag moves into a recess 17 in the seating surface 2 of the seating shell 1. In this getting in position the airbag 7 is flushly closed with the seating surface 7. The operation is effected via a lever 18 which projects outwards at the front side of the carrying frame 5 and embodies an extension of the longitudinally extending part of the carrier 15 running under the seating surface 2. The lever 18 is provided with a knob at its front side and is equipped with a locking mechanism which ensures that the carrier 15 is positively supported in the working position 10.

FIG. 4 represents a further embodiment variation. The seat, represented here only in the lower region, in which the seating shell and carrying frame are formed as one piece, likewise comprises a seating surface 2 and a back rest surface 3 as well as lateral rests 4. The airbag 7 which is arranged at the end of a carrier 19 can also be moved from a working position 10 into a getting-in position in which the airbag 7 lies protected in a recess at the front side underneath the seating surface 2 and is deactivated. The carrier 19 is formed arch shaped and guided within the seat under the seating surface 2 in a profiled recess corresponding to the cross-sectional profile of the carrier 19, and is provided with a lever 20 running transversely to this, said lever extending into the seat via a lateral recess 21. With this lever 20, which is lockable at least in the end position in which the airbag 7 assumes the working position 10, the pivoting out and pivoting in of the airbag 7 is made possible.

What is claimed is:

1. An add-on child seat for a vehicle comprising a seating surface and a back rest surface for a child and comprising an airbag arranged at a distance to these surfaces as an impact protection in the case of a collision of the vehicle, said airbag being arranged on a carrier adapted to lie between legs of a child and which is pivotally anchored under the seating surface, characterized in that the airbag forms an end of the carrier;

said carrier comprising a lever for permitting said carrier to pivot between a working position defining when said child is situated in said carrier and an ingress position defining when a child may be placed in or removed from said carrier, said seat further comprising releasing electronics which closes an electrical contact in a connection lead to a propellant charge when said carrier is moved to said working position and which facilitate blocking said release of the airbag when in the ingress position.

2. A child seat according claim 1, characterized in that an electrical lead for an ignition impulse of said propellant charge is situated in the carrier such that it is not visible outside of the carrier when the carrier is in said working position.

3. A child seat according to claim 1, characterized in that the carrier forms part of a belt system comprising a part of a belt lock, said part being connectable with at least one further lock part of at least one lap and/or shoulder belt.

4. A child seat according to claim 1, characterized in that said child seat further comprises a carrying frame and a seating shell pivotally mounted therein and further characterized in that the carrier is fastened to the seating shell.

5. A child seat according to claim 1, characterized in that the carrier is pivotally coupled and is pivotable into said working position of the airbag using said lever which is lockable in said working position.

6. A child seat according to claim 1, characterized in that the carrier is arcuately shaped, is guided in a guide arranged under the seating surface and can be brought into said working position of the airbag using said lever which is lockable in said working position.

7. A child seat according to claim 1, characterized in that said carrier may be selectively pivoted so that the airbag lies flush in the seating surface.

8. A child seat according to claim 1, characterized in that said carrier may be selectively pivoted so that the air bag lies flush in an end side of the child seat.

* * * * *